(12) United States Patent
Field

(10) Patent No.: US 8,705,054 B2
(45) Date of Patent: Apr. 22, 2014

(54) SYSTEM AND METHOD FOR UTILIZING EXCESS PRINTING CAPABILITY

(75) Inventor: Andrew S. Field, Emigrant, MT (US)

(73) Assignee: Printingforless.com, Livingston, MT (US)

(*) Notice: Subject to any disclaimer, the term of this patent is extended or adjusted under 35 U.S.C. 154(b) by 0 days.

(21) Appl. No.: 12/861,447

(22) Filed: Aug. 23, 2010

(65) Prior Publication Data

US 2011/0040597 A1   Feb. 17, 2011

Related U.S. Application Data

(63) Continuation of application No. 10/378,165, filed on Mar. 3, 2003, now Pat. No. 7,796,283.

(60) Provisional application No. 60/360,791, filed on Mar. 1, 2002.

(51) Int. Cl.
*G06F 15/00* (2006.01)
*G06Q 10/00* (2012.01)

(52) U.S. Cl.
USPC ....... 358/1.13; 358/1.15; 358/1.16; 358/1.17; 358/1.18; 358/1.1; 358/1.9; 705/7.27; 705/400; 709/201; 709/203; 709/213; 709/216

(58) Field of Classification Search
USPC ............... 358/1.11–1.18, 400, 506, 487, 407, 358/404, 468, 1.9, 448, 451, 452; 399/82, 399/84; 101/494; 709/219–229; 705/400, 7, 705/14, 26
See application file for complete search history.

(56) References Cited

U.S. PATENT DOCUMENTS

| | | | |
|---|---|---|---|
| 4,839,829 A | 6/1989 | Frredman | |
| 4,908,301 A | 3/1990 | Grosso et al. | |
| 5,241,464 A | 8/1993 | Greulich et al. | |
| 5,287,194 A | 2/1994 | Lobiondo | |
| 5,813,348 A | 9/1998 | Zingher | |
| 5,826,244 A | 10/1998 | Huberman | |
| 5,995,723 A | 11/1999 | Sperry et al. | |
| 6,012,070 A * | 1/2000 | Cheng et al. | 715/234 |
| 6,076,080 A | 6/2000 | Morscheck et al. | |
| 6,134,568 A | 10/2000 | Tonkin | |
| 6,247,011 B1 | 6/2001 | Jecha et al. | |
| 6,324,521 B1 | 11/2001 | Shiota et al. | |
| 6,330,542 B1 | 12/2001 | Sevcik et al. | |
| 6,333,790 B1 | 12/2001 | Kageyama | |
| 6,337,712 B1 | 1/2002 | Shiota et al. | |
| 6,441,920 B1 | 8/2002 | Smith | |
| 6,504,620 B1 * | 1/2003 | Kinjo | 358/1.15 |
| 6,535,294 B1 | 3/2003 | Arledge et al. | |

(Continued)

OTHER PUBLICATIONS

UPS: Thurmond, Jeffery; "Shipping Into the Next Century," The National Public Accountant, Jun. 1996, v41n6p. 13, 2pgs, Proquest #9667408.

UPS: www.ups.com; Internet Archive Wayback Machine, www.archive.org/web/19970605xxxxxx/http://www.ups.com/; 1997, 14 pages.

(Continued)

*Primary Examiner* — Chad Dickerson
(74) *Attorney, Agent, or Firm* — Winthrop & Weinstine, P.A.

(57) ABSTRACT

The present invention is a system and method for utilizing excess printing capacity. The present invention utilizes a printing network that consists of a printing service provider, one or more print jobs, a printing distribution system, and printing partners. The printing service provider uses a printing distribution system to distribute standardized print jobs to printing partners at a fixed price.

5 Claims, 11 Drawing Sheets

(56) References Cited

U.S. PATENT DOCUMENTS

| | | | |
|---|---|---|---|
| 6,631,375 B2 | 10/2003 | Jecha et al. | |
| 6,950,198 B1 | 9/2005 | Berarducci et al. | |
| 6,980,964 B1 | 12/2005 | Cocotis et al. | |
| 7,042,585 B1 * | 5/2006 | Whitmarsh et al. | 358/1.15 |
| 7,081,969 B1 | 7/2006 | Motamed et al. | |
| 7,120,634 B2 | 10/2006 | Jecha et al. | |
| 7,126,708 B1 * | 10/2006 | McConn et al. | 358/1.15 |
| 7,239,408 B1 * | 7/2007 | Whitmarsh et al. | 358/1.15 |
| 7,242,490 B1 * | 7/2007 | Palmer et al. | 358/1.15 |
| 2002/0019786 A1 | 2/2002 | Gonzalez et al. | |
| 2002/0024686 A1 | 2/2002 | Uchiyama et al. | |
| 2002/0026379 A1 | 2/2002 | Chiarabini et al. | |
| 2002/0063887 A1 | 5/2002 | White | |
| 2002/0077878 A1 | 6/2002 | Castellani et al. | |
| 2002/0079486 A1 | 6/2002 | Sarathy et al. | |
| 2002/0196452 A1 | 12/2002 | Komiya | |
| 2003/0107760 A1 * | 6/2003 | King et al. | 358/1.15 |
| 2004/0008369 A1 | 1/2004 | Keane et al. | |
| 2004/0008370 A1 | 1/2004 | Keane et al. | |
| 2004/0130741 A1 | 7/2004 | Ferlitsch | |
| 2005/0108036 A1 | 5/2005 | Andreoli et al. | |
| 2005/0195419 A1 | 9/2005 | Tytgat | |
| 2006/0152776 A1 | 7/2006 | Bailey | |

OTHER PUBLICATIONS

Edwards et al., "Roll Over Gutenberg: How the Web is Changing Printing," Seybold Report on Internet Publishing, Sep. 1997, v2n1p. 5(16), Dialog file 275 #02110082.

Eliezer, "Robert's web: Printer Cuts Turnaround Time With Web (A&a Printers and Digital Graphics Offers Printing Services Via the Company's Web Page)," Seybold Report on Desktop Publishing, Dec. 11, 1995, v10n4p. 20(6), Dialog 275 #01893823.

Printing Impressions, "Section 3: Prepress Electronic Imaging", Jul. 1998, v41n2p. 148(1), Dialog file 16 #06057253.

OIC: Morton, "The Competitive Arsenal in the Small Shipment Wars," "Transportation & Distribution, Mar. 1996, v37n3p. 65, ISSN #08958548, Proquest.

Real-time: Wilson, Doug, "Going Gateway One Better," Reseller Management, Feb. 1998, v21n2p. 64, Proquest.

Real-time: Way, Paul; "Progressive Sells, Binds Auto Insurance on Net," Insurance and Technology, Oct. 1997, v22n10pg Proquest #22387774, 3pgs.

Veeramani et al.; "Methodologies for Rapid and Effective Response to Request for Quotation (RFQs)," IIE Transactions, Oct. 1997, v29n10p. 825, Proquest #23351982, 16 pgs.

Real-time: InforSpace Launches Fee, real-Time Quotes and Other Investment Services to Consumers, PR Newswire, Feb. 17, 1998, Proquest #26408924.

* cited by examiner

Fig. 5

Partner Auto-Assignment Settings

134 → 136 →

Total Assigned to ECP - Today: $5,841.47  Last 5 Days: $38,973.70  This Month: $160,265.57

10 Waiting for PFL-Net and Posted Actionables Found

138 → 140 →

| Order Number | Status | File | Status Date | Customer | New or Returning | Rush | Must Ship By | Ship To | Description | Comm Flag | 24-Post2Net | 215 ECP |
|---|---|---|---|---|---|---|---|---|---|---|---|---|
| 386130063 | 21 | | | Valley Advocate | Returning | 15 | | Easthampton, MA | 500 4 x 6 Postcards, 4-Color/Black, No Coating, 120# Gloss Cover | Yes | O | O |
| 385099920 | 21 | | | Plastic Sturgeon | New | | | Los Angeles, CA | 500 4 x 6 Postcards, 4-Color/Black, Gloss Aqueous, 120# Gloss Cover | | O | O |
| 383481012 | 21 | | | Cornerstone Church | New | | | Blue Springs, MO | 500 %L5 x 8.5 Postcards, 4-Color/4-Color, No Coating, 120# Gloss Cover | | O | O |
| 383020073 | 21 | | | Wheaton College | New | S | | Wheaton, IL | 1000 4 x 6 Postcards, 4-color/Black Gloss Aqueous, 120# Gloss Cover | | O | O |
| 384455052 | 21 | | | Wealth Management Associates LLC | New | | | Tampa, FL | 1500 8.5 x 11 Brochures, 4-Color/4-Color, No Coating, 100# Gloss Text, Tri fold | | O | O |
| 385594017 | 21 | | | Mayet Design Studio | New | 15 | | New York, NY | 500 4 x 6 Postcards, 4-Color/Black, No Coating, 120# Gloss Cover | Yes | O | O |
| 385485054 | 21 | | | Baumann & Associates | Returning | S | | Vacaville, CA | 1000 8.5 x 11 Brochures, 4-Color/4-Color, No Coating, 80# Gloss Text, Tri Fold | Yes | O | O |
| 379904014 | 21 | | | Devel Group | Returning | | | Bothell, WA | 1000 8.5 x 11 Catalogs, 4-Color/4-Color, 4-Color/4-Color, No Coating, 80# Gloss Text, 80# Gloss Text, Half Fold, Collate, Staple, 8 Pages | Yes | O | O |
| 378610158 | 21 | | | Paradise Construction | New | | | Brooklyn, NY | 5000 8.5 x 11 8 Page Catalog, 4-Color/4-Color, 4-Color/4-Color, Custom Coating, Toplate Dull 80# Cover or Comparable Stock, None, Fold, Gather, Saddle Stitch & Trim Collate, Staple | Yes | O | O |
| 383138995 | 21 | | | JJJ Online LLC | New | | | North Miami Beach, FL | 1000 4 x 6 Postcards, 4-Color/None, No Coating, 120# Gloss Cover | | O | O |

ECP - Exclusive Products

| Product Code | Description | Always ECP (215) | Always Review (21) | Other |
|---|---|---|---|---|
| 11x17 BR | 11 x 17 Brochures | ○ | ● | ○ |
| 11x17NL | 11 x 17 Newsletters | ○ | ● | ○ |
| 4x6PC | 4 x 6 Postcards | ○ | ● | ○ |
| 4x5PC | 4.25 x 5.5 Postcards | ○ | ● | ○ |
| 5x7PC | 5 x 7 Postcards | ○ | ● | ○ |
| 5x8CT | 5.5 x 8.5 Catalogs | ○ | ● | ○ |
| 5x8PC | 5.5 x 8.5 Postcards | ○ | ● | ○ |
| 8x11BR | 8.5 x 11 Brochures | ○ | ● | ○ |
| 8x11CT | 8.5 x 11 Catalogs | ● | ○ | ○ |
| 8x11NL | 8.5 x 11 Newsletters | ● | ○ | ○ |
| 8x14BR | 8.5 x 14 Brochures | ● | ○ | ○ |
| BCD | Business Cards | ● | ○ | ○ |
| CDC | CD Covers | ○ | ● | ○ |
| CBC | Custom Business Cards | ● | ○ | ○ |
| CSQ | Custom Quote | ● | ○ | ○ |
| ENV | Envelopes Only | ○ | ● | ○ |
| GCD | Greeting Cards | ● | ○ | ○ |
| LPO | Large Posters | ○ | ● | ○ |
| LHD | Letterhead Only | ● | ○ | ○ |
| LHE | Letterhead/Envelopes | ○ | ● | ○ |
| RCD | Rack Cards | ● | ○ | ○ |
| SPO | Small Posters | ○ | ● | ○ |

142

[Submit] [Reset]

SYSTEM AND METHOD FOR UTILIZING EXCESS PRINTING CAPABILITY

CROSS-REFERENCE TO RELATED APPLICATION(S)

This application is a continuation of U.S. patent application Ser. No. 10/378,165, filed on Mar. 3, 2003, issued as U.S. Pat. No. 7,796,283 on Sep. 14, 2010, the entire contents of which are incorporated herein by reference.

This application claims priority to U.S. Provisional Application Ser. No. 60/360,791, filed on Mar. 1, 2002, the contents of which is hereby incorporated by reference in its entirety.

BACKGROUND OF THE INVENTION

The traditional process of purchasing commercial color printing can be time consuming and error-prone. This has led businesses to rely on ad agencies and graphic designers to design and buy their printed materials. Unfortunately, the expense of ad agencies and design firms has made it cost-prohibitive for businesses, especially self-employed individuals and small businesses, to purchase professional quality printed materials.

The widespread growth of PC's and desktop publishing software has made it possible for anyone to design printed materials on their PC and furnish the digital layout file to a printer. However, these users do not always have an easy way to get professional-quality printing for their files. In addition, excess production capacity (idle presses) is a chronic problem in the capital-intensive printing industry. To solve this problem, printing services have made print orders available to printing companies through a bidding system that uses request for quotations.

This bidding system is time intensive because it requires a printing company to spend time estimating more jobs than it receives. For example, a printing company may enter bids on ten jobs, but only win the bid on five jobs. Thus, the printing company wasted time entering bids on jobs it did not receive. Further, this method of obtaining work is risky because the company is forced to bid on more work than it can do; thus, when a company underestimates the number of bids it will win, it may be left with more work than it can handle, or vice versa.

The bidding process used in the printing industry is also used by many other industries where production companies compete for work. In addition, other industries have production capacity issues, where it is difficult to control the flow of work from day to day.

There is a need for a system and method of matching job orders in a specific industry, such as the printing industry, with companies having excess production capacity in that industry. Further, there is a need to make the job orders instantly available to the companies in a standard format and at a fixed price, without requiring the production companies to incur the expense of generating price quotes in an attempt to capture orders.

BRIEF SUMMARY OF THE INVENTION

The present invention, in one embodiment, is a system and method of matching live print orders with excess printing capacity. The present invention utilizes a printing network that consists of a printing service provider, one or more print jobs, and printing partners. The printing service provider uses a printing distribution system to distribute standardized print jobs to printing partners at a fixed price. The printing partners can then select and complete one or more print jobs.

The present invention, in another embodiment, includes a printing distribution system. In the present invention, the print jobs are sent to the printing distribution system before being sent to the printing partners. The printing distribution system utilizes various parameters to determine whether to direct each order to the in-house production capacity operated by the printing service provider, or to make the order available to the network of printing partners. The system determines which orders are made available to each partner based on factors such as printing capabilities, location, and rating. Thus, partners do not spend time sifting through print orders not applicable or undesirable to them.

The printing network provides a convenient, easy-to-use resource via a system that allows printing partners to utilize their excess printing capacity. The printing network is part of a printing scheme that allows customers to enter printing orders via the Internet, telephone, mail, fax or other method and receive the finished product via the mail, United Parcel Service, Federal Express, or other type of delivery service.

The present invention, in a subsequent embodiment, is a system and method for matching job orders in a specific industry with companies having excess production capacity in that industry. As with the printing network described above, the subsequent embodiment of the present invention utilizes a production network to distribute job orders in a standard format and at a fixed price to fulfillment partners having excess production capacity.

The present invention is attractive to partners because it allows them to increase revenues without depressing local pricing. It also allows them to maintain full utilization of their high-end production facilities by accessing job orders based on capabilities and workload.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIGS. 5-11 are computer screen shots showing software applications for utilizing excess printing capacity, according to additional embodiments of the present invention.

DETAILED DESCRIPTION

Figure 1:
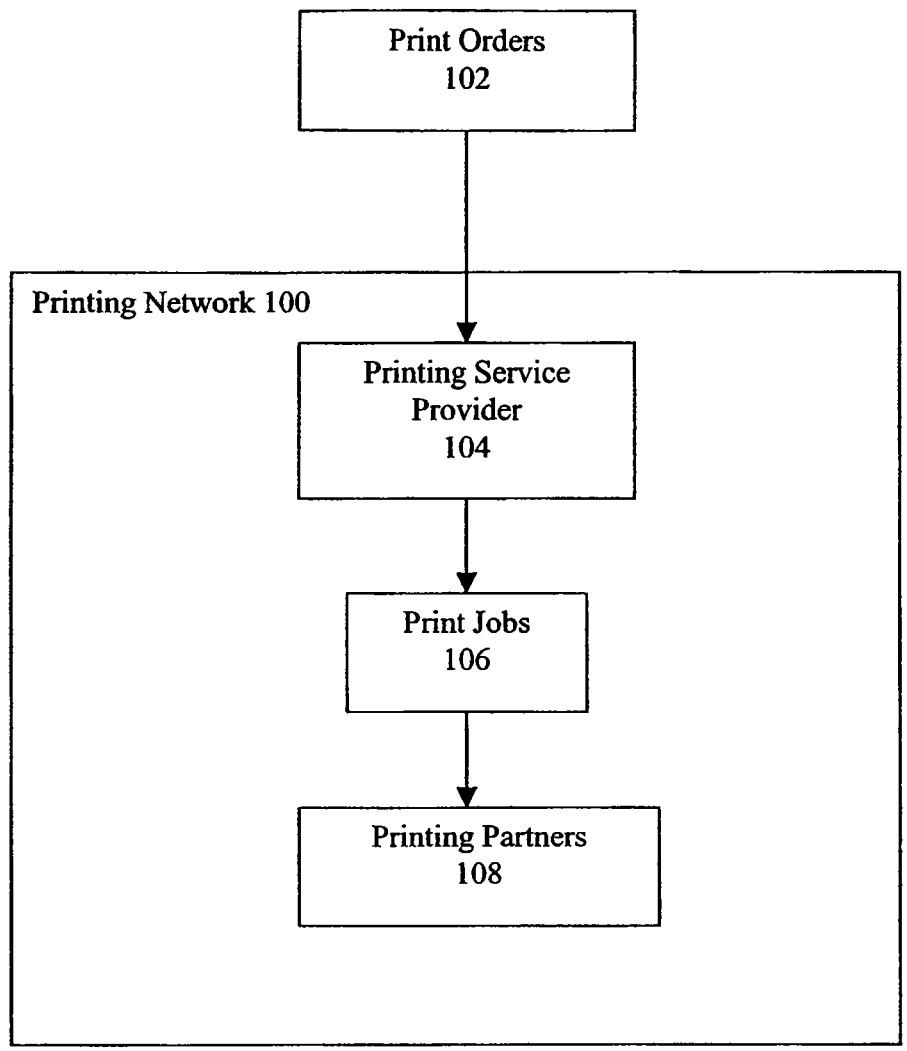
FIG. 1 is a flow chart showing a printing network, according to one embodiment of the present invention

FIG. 1 is a flow chart of Printing Network 100, according to one embodiment of the present invention. As shown in FIG. 1, the Printing Network 100 provides printing services for Print Orders 102. The Printing Network 100 includes a Printing Service Provider 104, Print Jobs 106, and Printing Partners 108.

The Print Orders 102 are submitted by customers via the Internet or other methods to the Printing Service Provider 104. The Print Orders 102 are developed by customers using a myriad of different application programs and then sent to the Printing Service Provider 104 in numerous formats. The Print Orders 102 also include customer specifications regarding printing requirements.

The Printing Service Provider 104 provides an on-line printing service for Print Orders 102. In other words, the Printing Service Provider 104 receives Print Orders 102 via the Internet and other methods and then produces and delivers it to the customer based on a customer-quoted price. In one embodiment, the Printing Service Provider establishes a customer-quoted price for each Print Order 102 by providing the customer with a job configuration and price calculator that resides on the customer's computer, as disclosed in co-pending U.S. application Ser. No. 09/518,060, filed Mar. 2, 2000, which is incorporated herein by reference in its entirety. The job configuration and price calculator allows the customer to automatically obtain a fixed price for each Print Order 102 based on the printing parameters selected by the customer. Thus, a new customer-quoted price is generated each time a customer selects a different job configuration. Once a customer is satisfied with the job configuration and customer-quoted price, the customer submits the Print Order 102 to the Printing Service Provider 104. In an alternative embodiment, the Printing Service Provider 104 may obtain a Print Order 102 using a custom quotation process, wherein the price may vary based on a variety of factors, such as the size or timing of the order. Ultimately, the Printing Service Provider 104 may use any method desirable to obtain a Print Order 102 and establish a customer-quoted price for the Print Order 102.

In addition to generating a customer-quoted price for each Print Order 102, the Printing Service Provider 104 converts each Print Order 102 into a standard digital format utilizing conventional conversion programs, such as Adobe Acrobat Distiller. The converted Print Orders 102 are referred to as Print Jobs 106. The digital proofs of Print Jobs 106 are sent to customers by the Printing Service Provider 104 for approval. Upon customer approval of the proof, the Print Jobs 106 are ready for printing. The digital format of Print Jobs 106 allows any number of on-line printing services to access and print the Print Jobs 106 without further manipulation. Each Print Job 106 includes, but is not limited to, one or more standard digital files containing a link to the digital files for the product that needs printing, the number of copies needed, the format of the copies, any binding requirements for the copies, etc. The Printing Service Provider 104 calculates a price for each Print Job 106 as a percentage of the customer-quoted price; thus, each Print Job 106 can be made available to on-line printing services for a set price.

The Printing Service Provider 104 makes information about the Print Jobs 106 available via the Internet to a network of pre-qualified printing providers referred to as Printing Partners 108. The Printing Partners 108 are pre-qualified by the Printing Service Provider 104 based on any number of qualifications. For example, the Printing Service Provider 104 may require each Printing Partner 108 to have a certain level of printing capability or be able to handle special printing requests, such as high-end color printing. The Printing Service Provider 104 may require each Printing Partner 108 to access Print Jobs 106 utilizing secure access methods, such as a login with a password. In addition, the Printing Service Provider 104 may allow Printing Partner 108 to view all available Print Jobs 106 or only a limited portion of the Print Jobs 106 based on pre-defined criteria for that Printing Partner 108.

Each Printing Partner 108 can view each Print Job 106, including all the printing parameters and the pre-set price, and decide whether or not it has the capacity to handle the job. The Printing Partners 108 are never required to select and print any of the Print Jobs 106, but instead can select the jobs based on their capacity. At the same time, the Print Jobs 106 are made available on a first-come, first-served basis, such that Printing Partners 108 are not guaranteed Print Jobs 106. In addition, the Printing Service Provider 104 may not make all the Print Jobs 106 available to all the Printing Partners 108. As an example, the Printing Service Provider 104 may not make catalogs available to Printing Partners 108 that are not capable of printing catalogs.

As explained above, the Print Jobs 106 are made available at pre-set prices based on a percentage of the customer-quoted prices. Thus, the Printing Network 100 involves no request for quotation or bidding between the Printing Service Provider 104 and the Printing Partners 108. In addition, Printing Partners 108 are not required to submit general pricing information for use in pricing Print Jobs 106. Thus, the Printing Partners 108 can view live jobs, and the first Printing Partner 108 who sees the job and commits to meeting the specified shipping date for the pre-established price can claim the job. This process allows the Printing Partners 108 to instantly select one or more of the Print Jobs 106 instead of spending time bidding jobs they are not guaranteed to receive. In addition, Printing Partners 108 save money by selecting the Print Jobs 106 that produce the greatest profits based upon their current production capacity. The end result is that the Printing Partners 108 can utilize excess printing capacity on a just-in-time basis.

Figure 2:
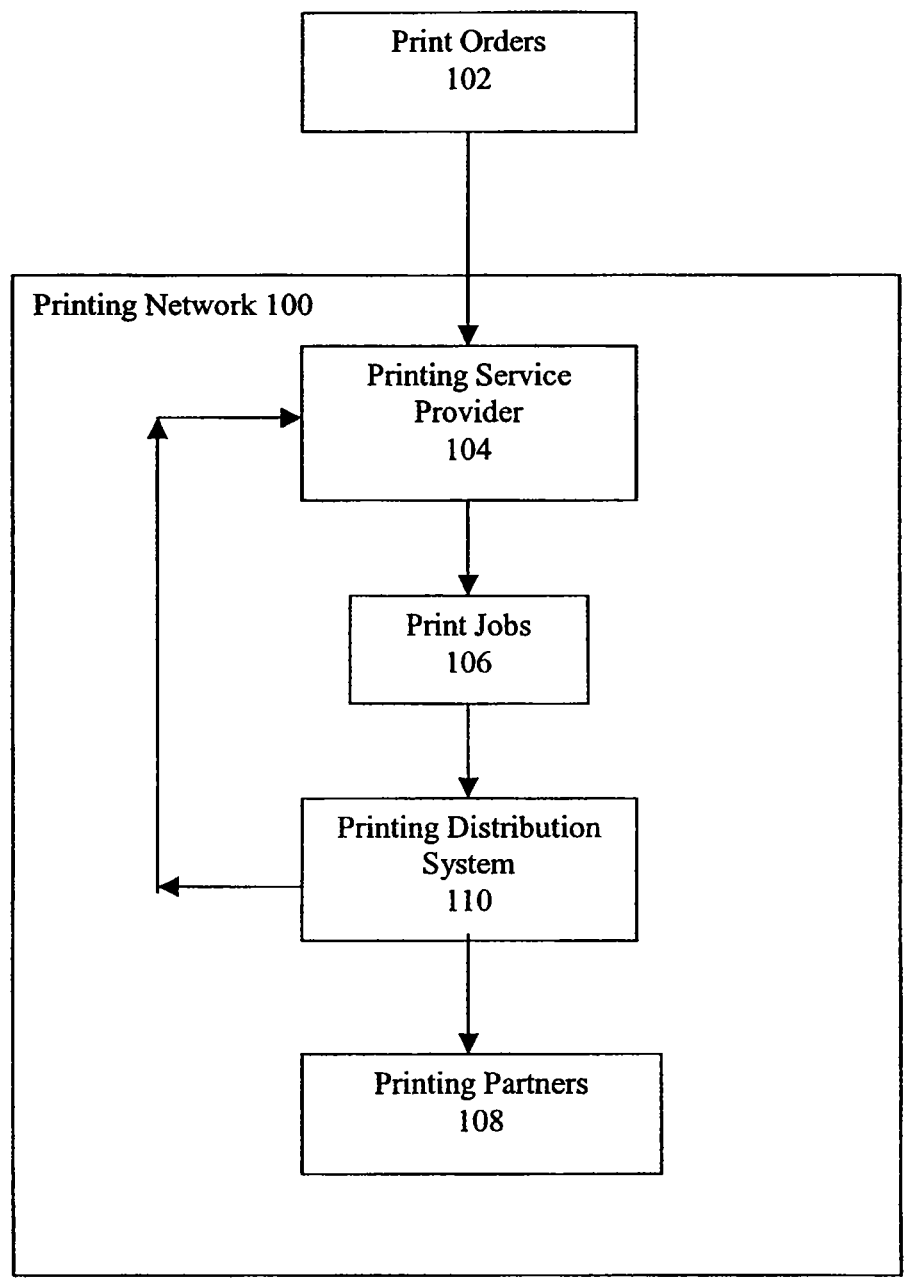
FIG. 2 is a flow chart showing a printing network, according to a second embodiment of the present invention.

FIG. 2 shows a second embodiment of the Printing Network 100 that utilizes Printing Distribution System 110 to pre-sort Print Jobs 106. Printing Distribution System 110 limits the Print Jobs 106 that can be viewed and selected by the Printing Partners 108 based on, but not limited to, the capacity and services offered by each Printing Partner 110. This eliminates the time the Printing Partners 110 spend sorting through jobs that are not applicable or desirable to their respective printing services. For example, not all Printing Partners 110 are capable of printing large posters. Thus, only Printing Partners 110 that can print large posters would be able to view jobs involving large poster boards.

Figure 3:
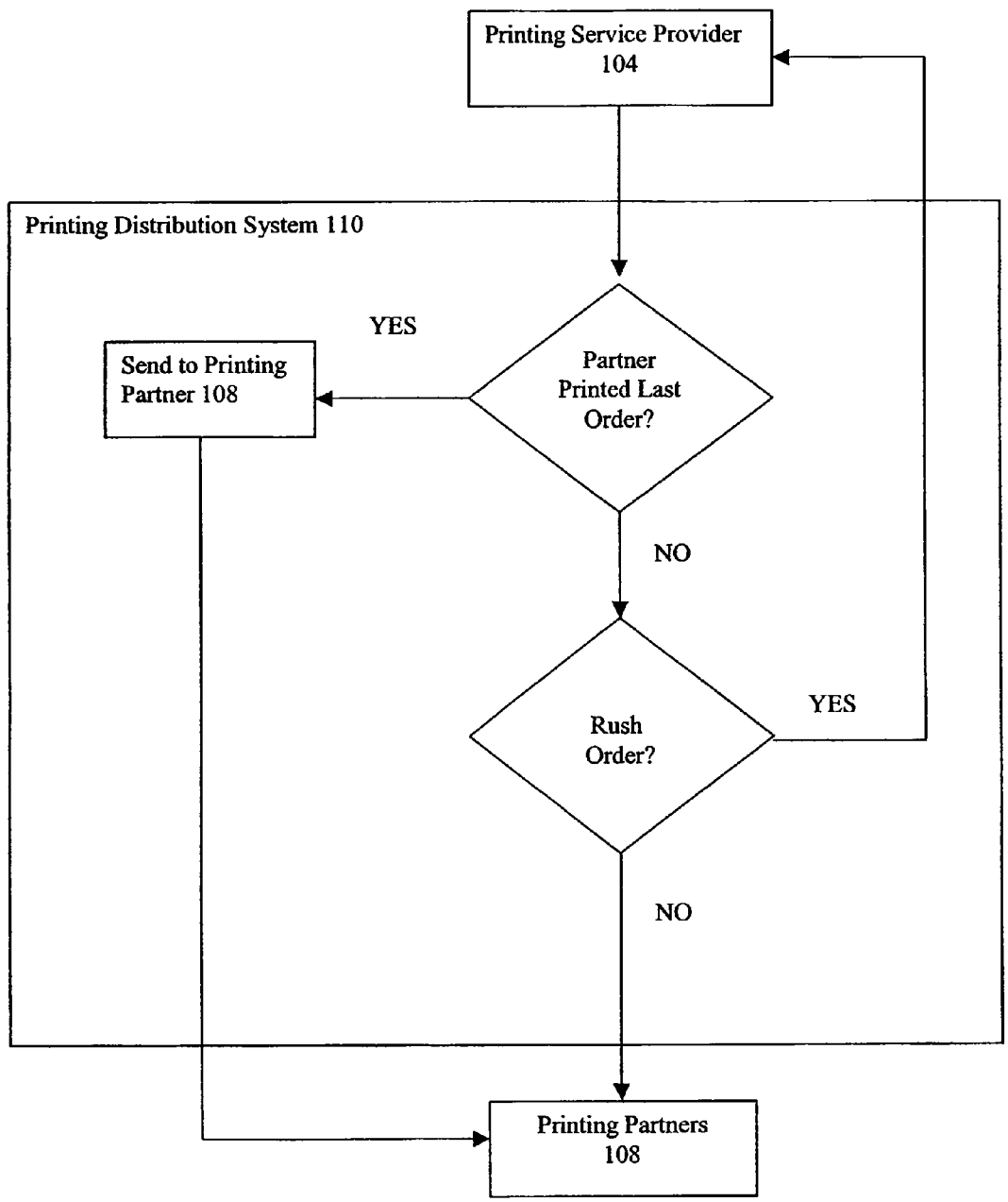
FIG. 3 is a flow chart showing a printing distribution system, which is part of the printing network shown in FIG. 2.

FIG. 3 shows an example of the sorting process used by Printing Distribution System 110. Printing Distribution System 110 may be applied manually or automatically utilizing a software program that may reside on Printing Service Provider's 104 computer or a stand-alone computer networked with the Printing Service Provider's 104 computer. Printing Distribution System 110 steps through a series of questions to determine where to post particular Print Jobs 106. In other words, Printing Distribution System 110 determines which Print Jobs 106 will be made available to each Printing Partner 108.

As shown in FIG. 3, Print Job 106 is entered into Printing Distribution System 110. Initially, the System 110 determines if one of the Printing Partners 108 handled one or more of the previous jobs for a particular customer. If a Printing Partner 108 has worked with a previous customer, then the Print Job 106 for that customer may be made available to that specific Partner 108 for a pre-established amount of time, such as three hours. An additional notification, via e-mail, telephone, pager, or other means, may also be sent to the Partner 108 to alert them of the availability of the order. This allows the Partner 108 to take advantage of its familiarity with a particular customer and for the customer to receive the same type of service and satisfaction that it previously received from the Partner 108. If the Partner 108 does not select the job within that pre-set time, the job is sent through Printing Distribution System 108 again.

Although not shown in FIG. 3, this step may also include determining if the job was previously handled by Printing Service Provider 104. In other words, Printing Service Provider 104 may have provided the previous printing service to a customer. As explained previously, Printing Service Provider 104 is not required to make a certain amount of Print Jobs 106 available to the Printing Partners 108, but instead may only make Print Jobs 106 available that are beyond its capacity. Thus, if the Printing Service Provider 104 handled the previous Print Job 106 from a particular customer, then it would have the option of handling the next Print Job 106 from that customer. The Printing Distribution System 108 is flexible and is not limited to handling Print Jobs 106 from previous customers in the manner described above, but instead may opt for a more efficient method based on day to day experience of distributing the Print Jobs 106.

Another factor that may be used by the Printing Distribution System 106 to decide how to handle Print Jobs 106 is the rush order status of a job, as shown in FIG. 3. Rush orders are typically handled in-house by the Printing Service Provider 104 to insure the project is done timely. These orders typically have a higher profit margin, which provides an incentive for the Printing Service Provider 104 to keep the work in house. However, the Printing Distribution System 110 is not limited to handling rush orders in the this manner.

There are many parameters used by Printing Distribution System 110 to determine which Printing Partners 108 will be allowed to see Print Jobs 106. The parameters shown in FIG. 3 provide an example of two criteria, but Printing Distribution System 110 is not limited to these parameters. Additional parameters may include, but are not limited to: geographic location (i.e., preference for closer states or UPS zones), quantity, paper stock type, coating selection (i.e., flood aqueous, gloss varnish, dull varnish, etc.), product type (brochures, postcards, stationery, etc.), and rating. The sequence of the parameters is not limited. Depending on the criteria of an individual Print Job 106, a unique sequence of parameters may be used to determine where to post the job. In certain situations, an individual Print Job 106 may be made available to only one Printing Partner 108, but typically Print Jobs 106 are made available to multiple Printing Partners 108. One Printing Partner 108 is never allowed to monopolize all the print jobs. At the same time, only those jobs that fit the parameters of a Printing Partner 108 are typically made available to the Partner 108. This ensures that the Printing Partners 108 do not have to sort through lots of inapplicable or undesirable orders to find Print Jobs 106 that are suitable to their capabilities. The Printing Distribution System 110 is a flexible system and has the ability of making none, all, or some of the Job Orders 106 available to each Printing Partner 108 based on pre-established criteria.

As mentioned above, rating is one of the parameters that may be used by the Printing Distribution System 110 to determine which Print Jobs 106 are made available to each Printing Partner 108. To establish a rating for each Printing Partner 108, each Partner 108 is rated by the Printing Service Provider 104 according to performance and assigned a "grade" or performance rating based upon performance criteria. The performance criteria includes, but is not limited to: overall print quality, color balance, registration, success rate in processing print files, on-time shipment performance, and a variety of other measurements. These ratings are frequently reviewed and updated to insure the Printing Partners 108 are producing quality products for customers. For example, in order to give the Printing Partners 108 an incentive to perform at the best possible level, the Printing Distribution System 110 may allow higher-rated partners to have access to jobs before lower-rated partners.

Figure 4:
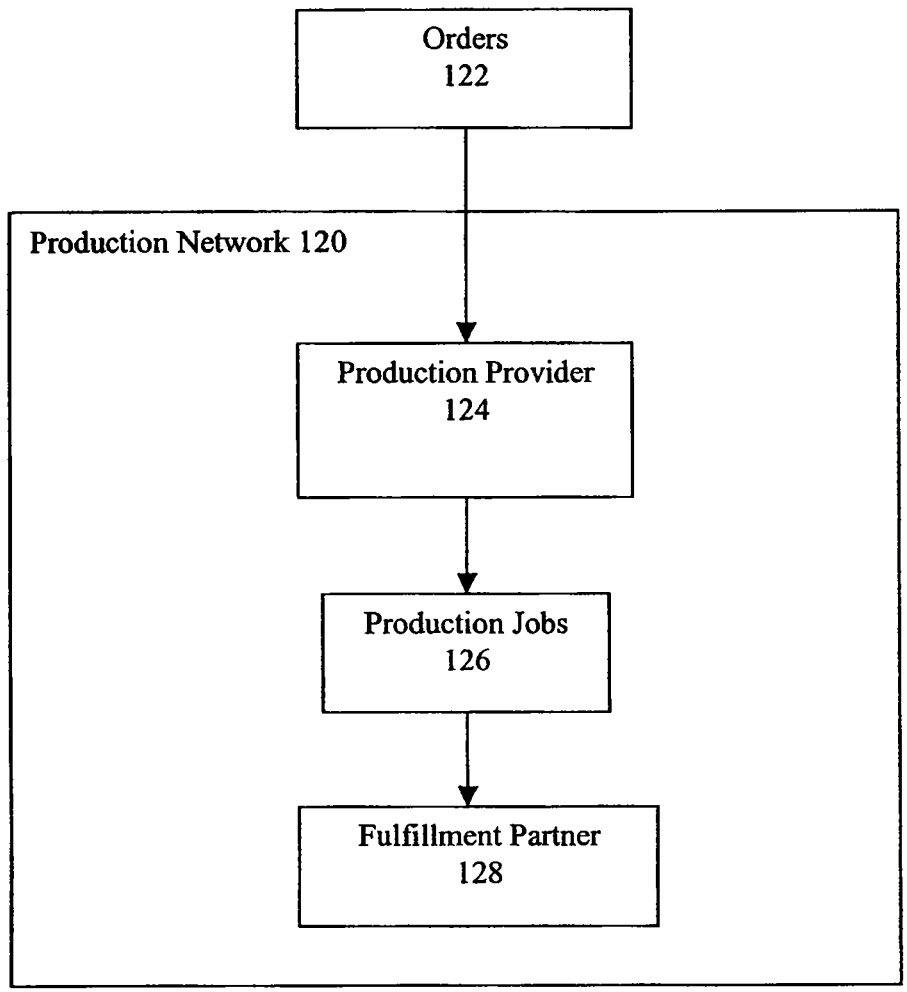
FIG. 4 is a flow chart showing a production network, according to a third embodiment of the present invention.

FIG. 4 is a flow chart of Production Network 120, according to a third embodiment of the present invention. As shown in FIG. 4, the Production Network 120 aggregates and distributes Orders 122. The Production Network 120 includes a Production Service Provider 124, Production Jobs 126, and Fulfillment Partners 128. The Orders 122 and associated specifications are submitted by customers via the Internet or other methods in various formats. One or more of the Orders 122 are then converted into Production Jobs 126 by converting each Order 122 into a format that is understandable and useable by the Fulfillment Partners 128. The Productions Jobs are made available to the Fulfillment partners 128. In alternative embodiments, the Production Jobs are made available to one or more Fulfillment Partners 128 based on pre-defined criteria, such as the location of the Partner 128.

Figure 5:
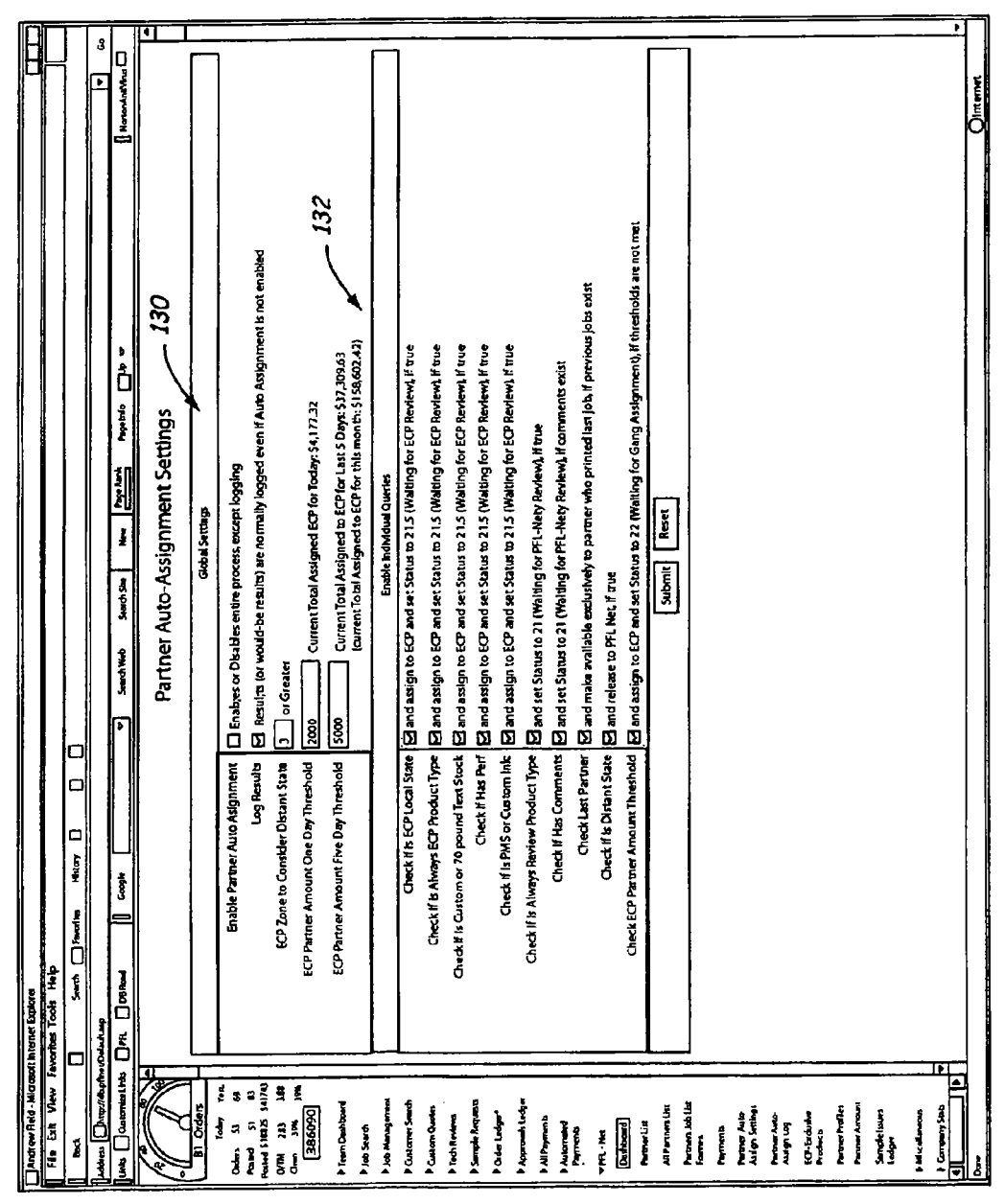

FIGS. 5-11 are computer screen shots showing user interfaces for various embodiments of the Printing Network 100. In FIG. 5, the user interface includes Global Settings 130 and Enable Individual Orders 132. Global Settings 130 and Enable Individual Orders 132 include various criteria that can be turned on and off for use by the Printing Distribution System 110. The Printing Distribution System 110 is not limited to using the number and order of criteria shown in FIG. 5, but may include any number of criteria used in any order.

In FIG. 5, the first criteria considered by the Printing Distribution System 110 is whether to automatically or manually distribute Print Jobs 106. Regardless of whether the decision is made manually or automatically, the same criteria may be used. In alternative embodiments, different criteria may be used to make manual versus automatic decisions for distributing the Print Jobs 106.

If the "Enable Partner Auto Assignment" box, shown under Global Settings 130, is not selected, then a user may manually distribute the Print Jobs 106 using the interface shown in FIG. 6. In FIG. 6, the user can look at the information displayed under the various Dashboard Headings 134 to determine where a Print Job 106 should be sent. For example, if a Status Heading 136 displays a number, such as "21," indicating that a decision needs to be made on a particular order, then a user may look at the information displayed under Dashboard Headings 134 to make the manual determination. If the user decides to send the work to the Printing Network 100, then Post2Net 138 may be selected. On the other hand, if the user decides to keep the work in house, then ECP 140 (which refers to "Express Color Printing," the in-house printing provider's name in this example), may be selected.

If the "Enable Partner Auto Assignment" box is selected in FIG. 5, then Print Jobs 106 are automatically distributed by the Printing Distribution System 110. A number of other interfaces are used to configure and show the status of the Printing Distribution System 110. For example, FIG. 7 shows the product types that ECP, the Printing Service Provider 104, can handle. The interface shown in FIG. 7 can also be used to configure the product types for each of the Printing Partners 108. The information under Exclusive Products Headings 142 allows a user to select the specific products that ECP or one of the Printing Partners 108 is capable of printing. While ECP may be handled exclusively as the Printing Service Provider 104, it may also be treated as one of the Printing Partners 110.

Figure 8:
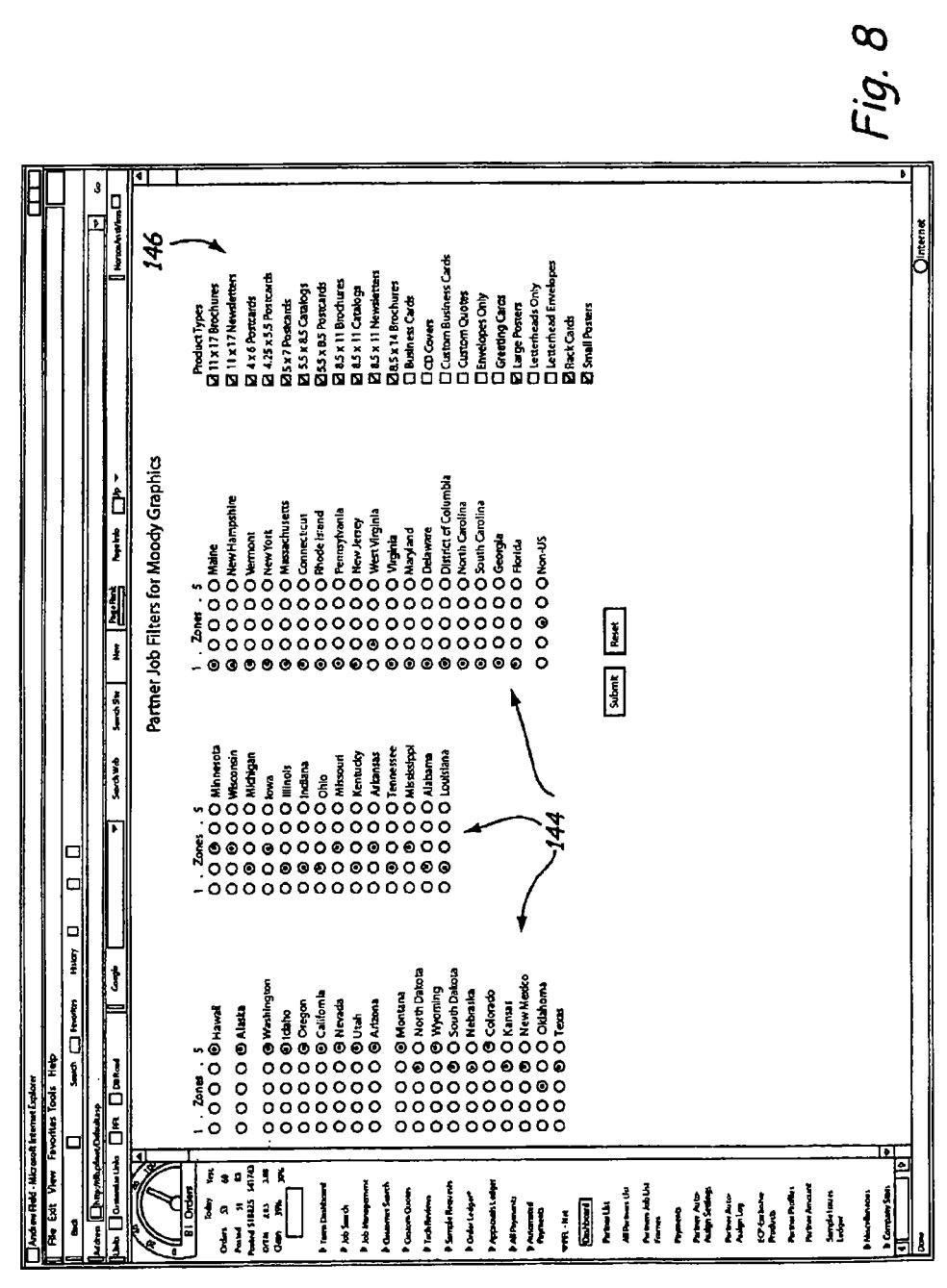

FIG. 8 provides an example of an interface that establishes geographic location and product information for each of the Printing Partners 108. Geographic Zones 144 shows the location of a Printing Partner 108, "Moody Graphics," relative to other states. Product Types 146 shows the type of products that "Moody Graphics" is capable of printing. This information may be used automatically by Printing Distribution System 110 or manually by a user to distribute Print Jobs 106 to the Printing Partners 108.

Figure 9:
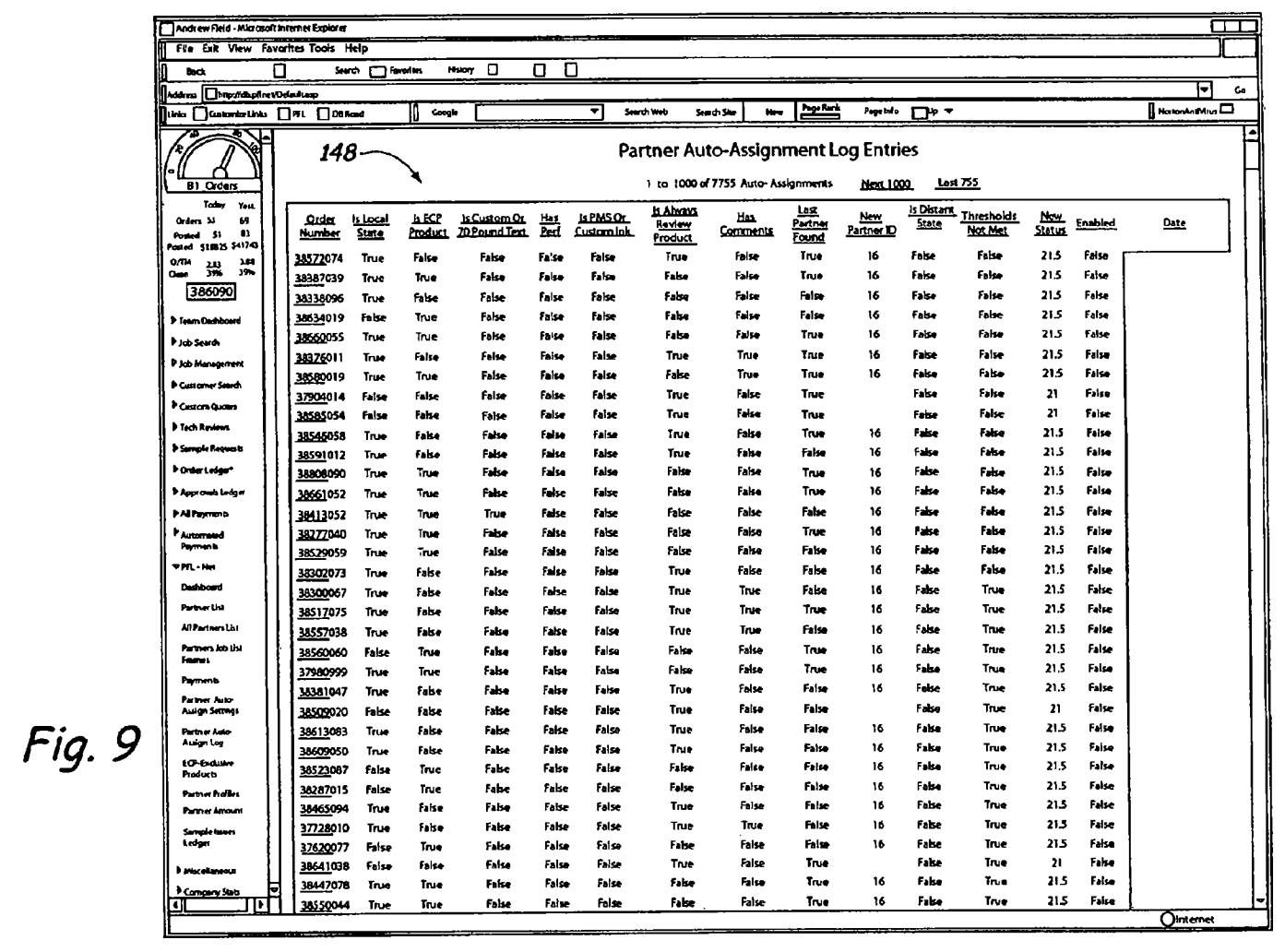

The interface shown in FIG. 9 follows the decisions being made by Printing Distribution System 110 when distributing Print Jobs 106. The Partner Assignment Headings 148 represent the type and order of criteria that are considered by Printing Distribution System 110. As an example, in FIG. 5, if the "Check If Is ECP Local State" box is selected, then the first criteria used to distribute Print Jobs 106 is whether the Print Jobs 106 will be delivered to customers that reside in states that are local to ECP. If one of the Print Jobs 106, such as the first Print Job shown in FIG. 9, is local to ECP, then under "Is Local State," will show the answer as "true." If the answer is "true," the Print Job 106 is given to ECP. If the answer is "false," then the next criteria shown in FIG. 5 is considered. Printing Distribution System 110 will step through all the criteria shown in FIG. 5 until a "true" statement is reached and the Print Job 106 is distributed to either ECP or one or more of the Printing Partners 108. The status of each of the criteria shown in FIG. 5 is reflected in the chart in FIG. 9, allowing a user to determine how each Print Job 106 was distributed.

Figure 10:
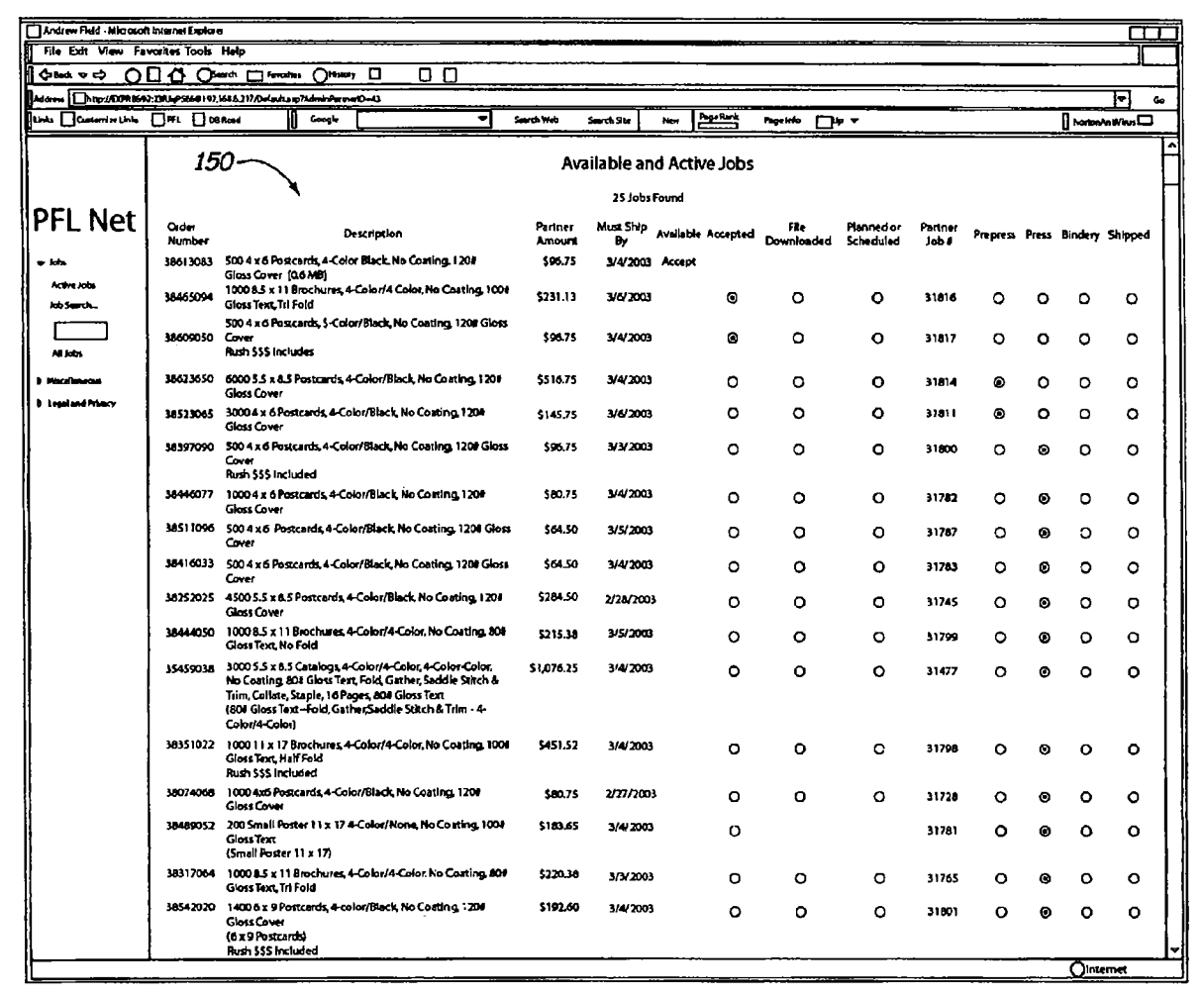

FIG. 10 shows an example of an interface listing potential print jobs for Printing Partners 108. This interface allows the Printing Partners 108 to evaluate the Print Jobs 106 based on the information under the Available and Active Job Headings 150. The interface integrates with the Printing Service Provider's 104 database in real-time. The Printing Partners 108 can then instantly select one or more jobs to process and assign an internal job order number. In addition, the Printing Partners 108 can use this site to generate job tickets with all the information needed to complete each Print Job 106. The site also provides a link for downloading Print Jobs 106. The link may be directly to Printing Service Provider's 104 internal server or to an outside server.

Figure 11:
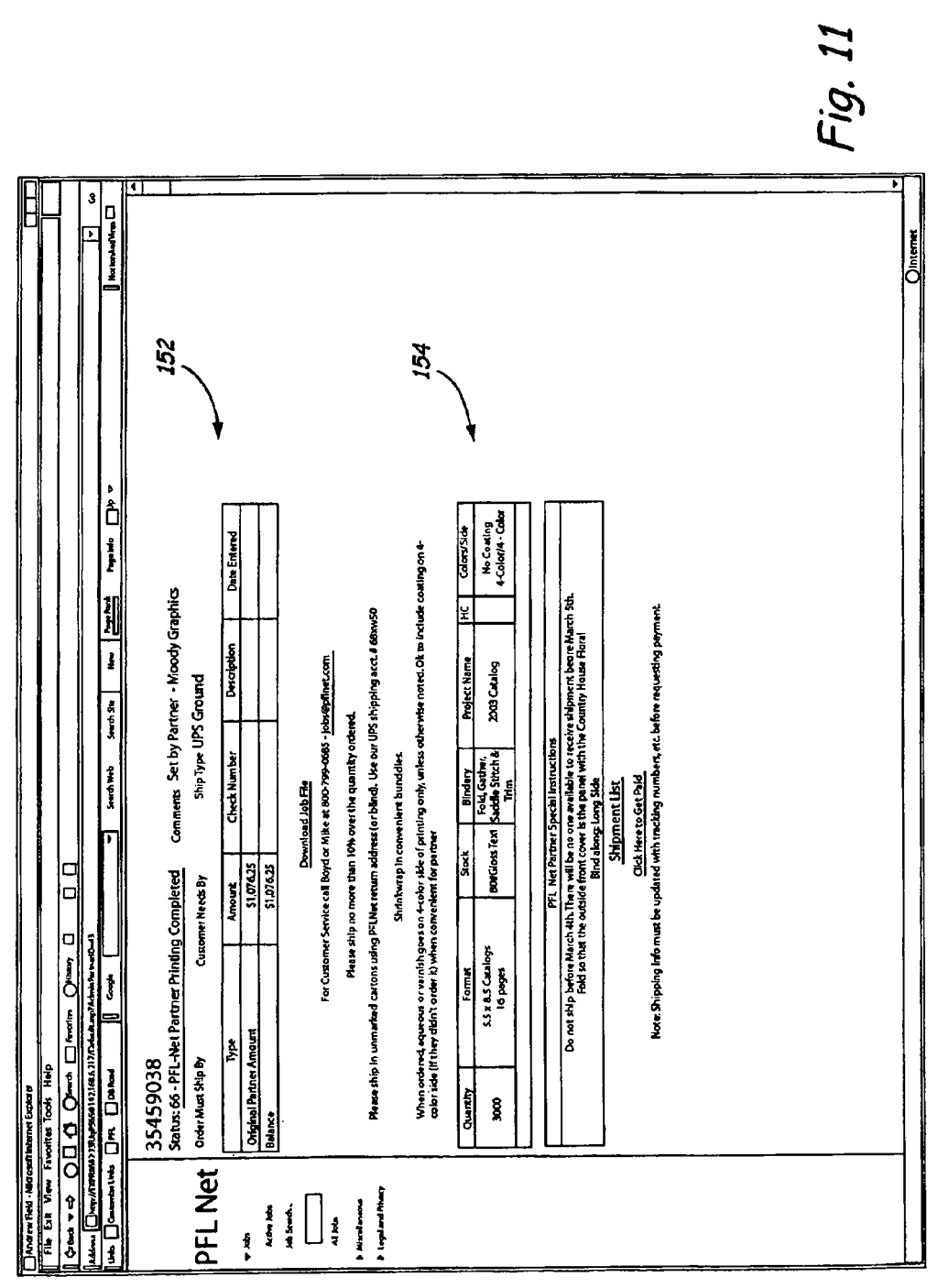

FIG. 11 shows an example of a job ticket created when a Printing Partner 108 selects one of the Print Jobs 106. The job ticket includes Financial Information 152 and Printing Specifications 154, in addition to all the other information needed to complete the Print Job 106.

The Printing Network 100 is designed to allow printing companies to liquidate their excess capacity anonymously, outside of their local market area. This allows the Printing Partners 108 to utilize their excess capacity (which would otherwise go to waste) without depressing pricing in their local market area. It also allows the Printing Partners 108 to keep their operational costs down because they can balance the equipment loading in their plants, selling excess press and bindery time, in order to maximize capacity utilization.

The Printing Network 100 takes advantage of excess printing capacity by forming a partnership with printing companies that have excess capacity. The Printing Network 100 efficiently utilizes the excess capacity by allowing partners to instantly select live orders based on fixed prices.

Although the present invention has been described with reference to preferred embodiments, persons skilled in the art will recognize that changes may be made in form and detail without departing from the spirit and scope of the invention.

I claim:

1. A computer-implemented method for utilizing excess production capacity in an industry, the method comprising:

aggregating one or more orders from customers;

establishing, by a fulfillment service provider, a network of one or more fulfillment partners within the industry, wherein the one or more fulfillment partners do not submit pricing, bidding, and cost information to the fulfillment service provider and the customers;

using computer-executable instructions to create a production job from the one or more orders by a fulfillment service provider processing the one or more orders into a standard format that is understandable and useable by the fulfillment partner within the industry;

receiving by the fulfillment service provider one or more production jobs created from the one or more orders submitted by the customers;

establishing by the fulfillment service provider a non-negotiable, pre-set price that is a percentage of a customer-quoted price;

determining by the fulfillment service provider whether to direct each production job to an in-house production capacity operated by the fulfillment service provider, or to make the order available to one or more fulfillment partners;

determining, by the fulfillment service provider, if the fulfillment service provider or a fulfillment partner handled one or more past production jobs associated with the customer;

making available by the fulfillment service provider a current production job to a fulfillment partner that has performed a past production job for the customer with the current production job, wherein the fulfillment partner is alerted to the availability of the current production job by email, internet, telephone, or pager;

sending the current production job through a distribution system of the fulfillment service provider, if the fulfillment partner identified as having completed past production jobs for the current customer does not select the current production job; and allowing each of the fulfillment partners an ability to select and complete one or more of the production jobs at the negotiated, pre-set price, and the first fulfillment partner that selects the production job outputs and delivers the production job to the customer.

2. The method of claim 1, wherein each of the one or more orders includes customer specifications.

3. The method of claim 1, wherein the method further includes rating each fulfillment partner based on one or more pre-established performance parameters and using the rating as one of the pre-established criteria.

4. The method of claim 2, wherein the method further includes rating each fulfillment partner based on one or more pre-established performance parameters including overall print quality, color balance, registration, success rate in processing print files, and on-time shipment performance, and using the rating as one of the pre-established criteria.

5. The method of claim 1, wherein the pre-established criteria includes geography and product attributes.

\* \* \* \* \*